Feb. 21, 1967

J. C. CARTER ETAL 3,304,877

SUBMERGED MOTOR DRIVEN PUMPING SYSTEM

Filed June 8, 1965

INVENTORS
JAMES C. CARTER
LOUIS R. SMITH
DONALD A. KAESSEN

BY Hill, Sherman, Meroni, Gross & Simpson

ATTORNEYS

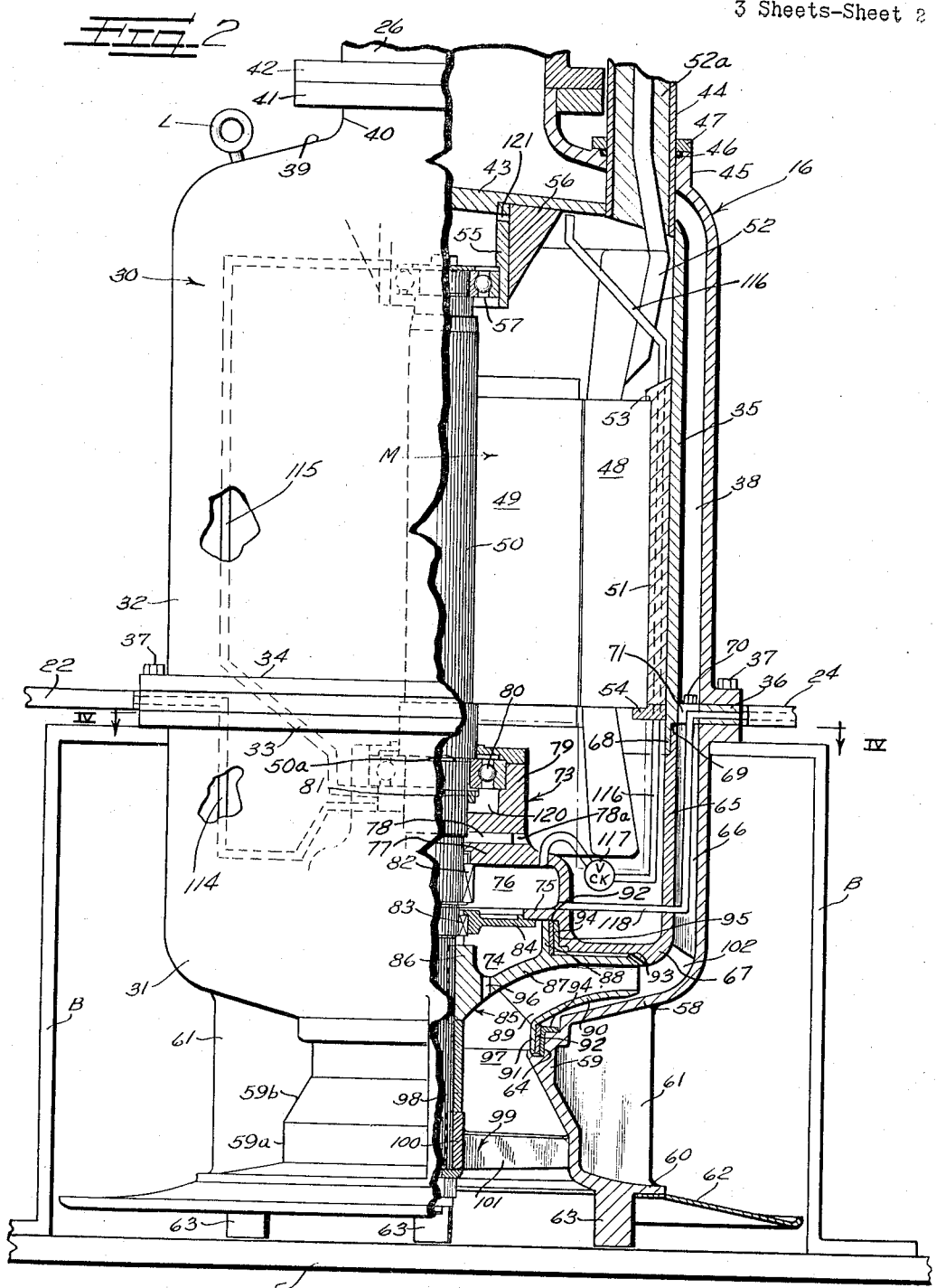

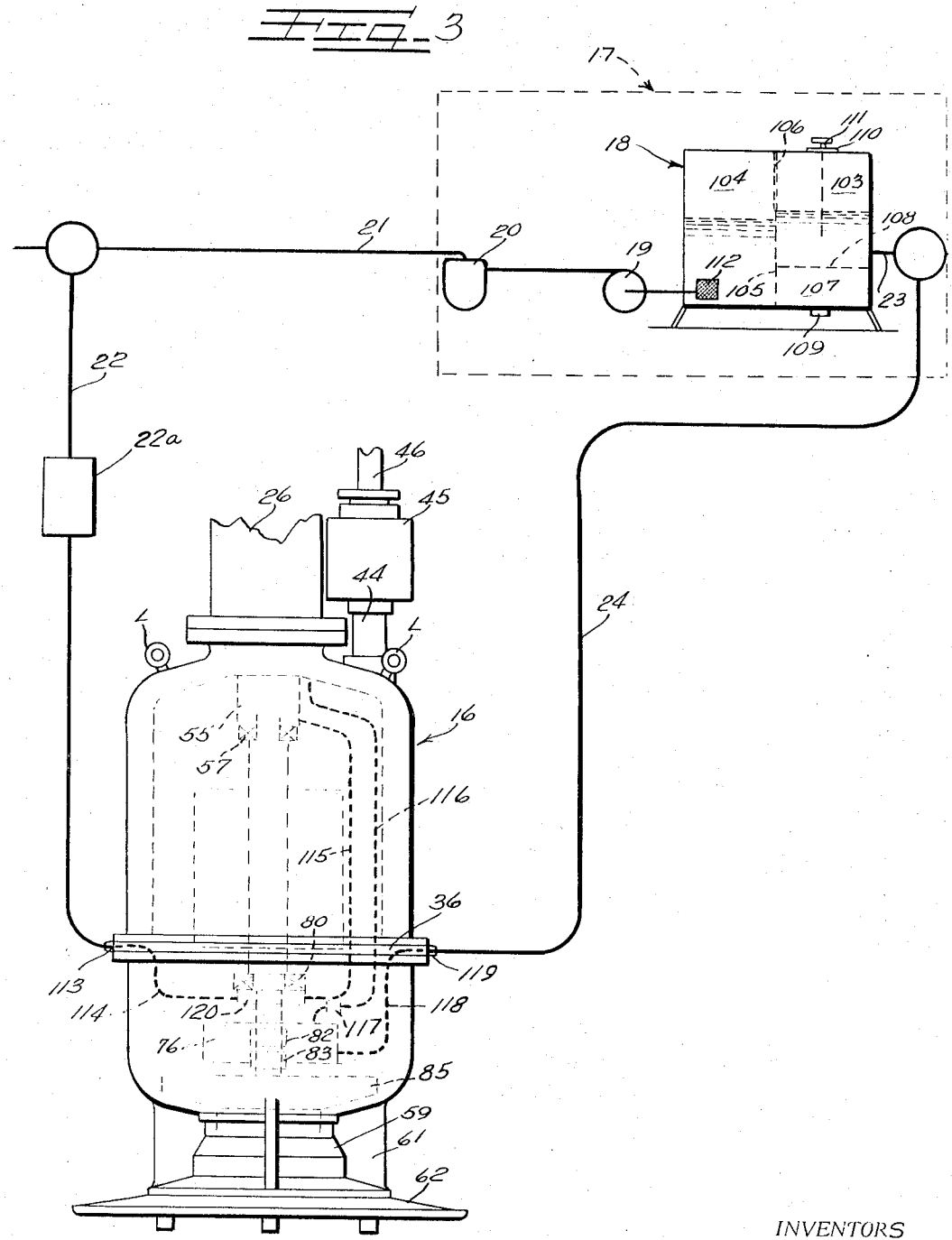

United States Patent Office 3,304,877
Patented Feb. 21, 1967

3,304,877
SUBMERGED MOTOR DRIVEN PUMPING SYSTEM
James C. Carter, Pasadena, Louis R. Smith, Costa Mesa, and Donald A. Kaessen, Downey, Calif., assignors to The J. C. Carter Company, Costa Mesa, Calif., a corporation of California
Filed June 8, 1965, Ser. No. 462,230
9 Claims. (Cl. 103—87)

This invention relates to a pumping system which protects the pumping apparatus even when submerged in a hostile environment and more specifically deals with pumping apparatus especially suitable for oil tankers or the like cargo ships wherein a liquid is circulated through the pumping apparatus for maintaining a non-corrosive high dielectric medium in the apparatus which will protect the same in a hostile crude oil or sea water environment while simultaneously controlling the temperature of the system and removing wear particles from the system.

The invention will hereinafter be described as embodied in an oil tanker type of cargo ship and as including a plurality of electric motor driven pumps submerged in the ship's tanks or hold and equally suited for pumping crude oil, salt water ballast or the like liquids from the ship. The submerged pumps are protected against the materials in which they are submerged by a closed loop lubrication system which floods the bearings and seals with liquid, creates a clean non-corrosive high dielectric media for the electric motor, controls the working temperature of the apparatus, and filters out wear particles. The liquid may be oil or other dielectric fluid such as fire resistant transformer liquids, petroleum oils, or other neutral, non-aggressive liquids preferably non-hygroscopic and reasonably good lubricants. As used herein the terms "oil" or "lubricant" will include such liquids.

The system of this invention includes electric motor driven centrifugal pump units mounted on or close to the bottom of the ship's tank and completely submerged in the contents of the tank. In large tankers these pumps may be of sixty feet or more below the surface of the liquid and must from time to time operate in a corrosive environment of sea water required for the ship's ballast voyage. These submerged pump and motor units are protected by this invention with support systems of circulating oil and while as many as fifteen submerged pumps may be provided, only one or two support systems, installed above deck are needed to service the entire group of pumps. The support system includes a supply tank, a filter, and an oil circulating pump adapted to maintain a pressure in the submerged pumps which is greater than the highest inlet pressure to which these pumps will be subjected. Thus with a sixty foot liquid head above the pump units, the oil circulating support system would be called upon to pressurize the motor compartments of the units sufficiently to overcome this head and thereby prevent in-flow of liquids surrounding the units into contact with the corrodable components of the motor.

The support system serves as a removal medium for any products of wear generated by or contamination from the mechanical seals or interior working parts of the motors. At the same time it provides a coolant medium or, if desired, a heating medium to maintain the desired operating temperature for the pump motor. In addition the lubricant supplied by the system provides an optimum lubricant for the motor bearings and mechanical seals of the pump while simultaneously providing a non-corrosive environment of high dielectric strength as a medium for the electric motor.

It is then an object of this invention to provide a pumping system which protects submerged pumps against hostile environments.

Another object of the invention is to provide apparatus for removing liquids from tankers and the like cargo ships wherein the apparatus is protected against the hostile environment of the liquids being pumped by a closed loop system which simultaneously prevents leakage into the apparatus, lubricates the apparatus, removes wear particles from the apparatus, and maintains a desired operating temperature for the apparatus.

Another object of this invention is to provide a submerged multiple pump apparatus with a closed loop lubrication system which is also effective to prevent leakage into the apparatus.

A specific object of this invention is to provide a submerged pump and motor unit with a lubrication device effective to prevent leakage into the motor while simultaneously lubricating the motor bearings and seals, providing a high dielectric environment for the motor, washing out wear particles from the motor and maintaining a desired operating temperature for the motor.

Another and more specific object of this invention is to provide a submerged electric motor driven centrifugal pump unit having a sealed motor compartment with lubricant distributing conduits therein to distribute pressurized lubricant from an outside source over the bearing surfaces of the motor.

Another specific object of the invention is to provide an electric motor driven centrifugal scavenge pump for oil tankers and the like liquid cargo ships adapted to be easily mounted in the bottom of a ship's tank or hold in completely submerged relation to the liquids to be scavenged and with a protection system serviced from the deck of the ship which will prevent leakage into the pump motor, lubricate the bearings and seals of the motor, maintain a high dielectric environment for the motor and remove wear particles from the motor.

Another specific object is to provide an electric motor driven submerged pump wherein the motor is constructed to be self-venting of gas, vapors or air and to be completely filled with an inert fluid, thereby rendering the motor explosion-proof and virtually fire resistant.

Other and further objects of this invention will be aparent to those skilled in this art from the following detailed description of the annexed sheets of drawings which, by way of a preferred example, only illustrate one embodiment of the invention.

On the drawings:

FIGURE 2 is a side elevational view, with parts broken away and shown in vertical cross section, of one of the electric motor driven centrifugal pump units of this invention;

FIGURE 3 is a somewhat diagrammatic view illustrating one of the electric motor driven pump units of this invention coupled with its support system of circulating oil;

As shown on the drawings:

Figure 1:
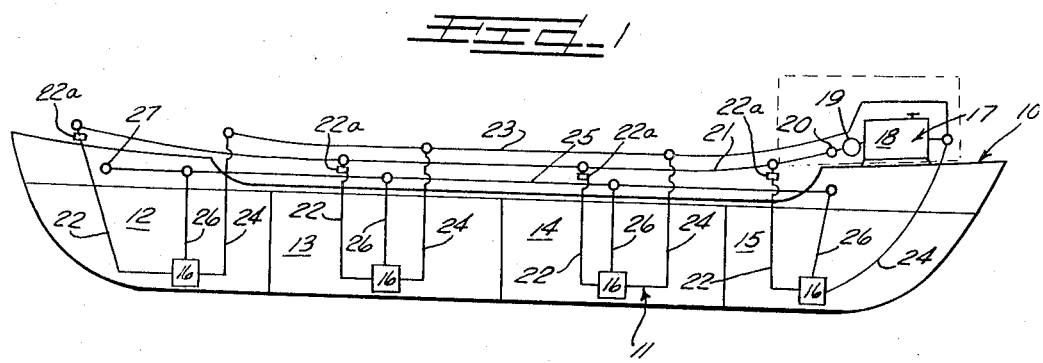
FIGURE 1 is a diagrammatic elevational view of a tanker or cargo ship equipped with a pumping system according to this invention.

In FIGURE 1 the reference numeral 10 designates generally an oil tanker ship equipped with a submerged motor driven pumping system 11 according to this invention. The ship 10 is illustrated as having four tanks 12, 13, 14 and 15 in the hold thereof, but it should be understood that any number of tanks or compartments can be provided. Each tank or compartment 12, 13, 14 and 15 has mounted in the bottom thereof, either directly on the bottom wall of the tank or hull or close thereto, an electric motor driven centrifugal pump unit 16 of this invention.

Above the hold or tanks of the ship 10, such as for example, on the deck, there is mounted a support system 17 for each of the pumps 16. This support system 17 includes a lubricant oil tank 18, an oil pump 19, a filter 20, an inlet header pipe 21 extending along the length of the ship with dependent branch inlet pipes 22 to each pump 16, and an outlet header 23 receiving return oil from branch pipes 24 connected to each pipe pump 16 and returning the oil back to the tank 18. A flow indicator and metering valve 22a is provided in the pipes 22 on multipump installations to monitor and regulate the flow of lubricant and to also signal excessive flow as from a damaged shaft seal in a particular unit. As also shown in FIGURE 1, a main outlet header 25 is provided along the length of the ship receiving liquids from branch pipes 26 connected to the outlet of each pump 16. The tanks 12, 13, 14 and 15 are thus emptied by the pumps 16 into the header 25 which has an outlet end 27 to be coupled to a dockside receiving tank.

As best shown in FIGURE 2, each electric motor driven centrifugal pump unit 16 of this invention has a generally cylindrical tank-like housing 30 composed of an open top generally cup-shaped bottom pump casing 31 and an open bottom cylindrical bell 32 with a radial flange 33 around the open top of the pump casing 31 and a complementary radial flange 34 around the open bottom of the bell 32. Telescoped within the bell 32 is a complementary shaped bell or cup housing 35 with a ported integral outturned radial flange 36 around the open bottom thereof sandwiched between the flanges 33 and 34. Bolts 37 through the flanges 33, 34 and 36 connect the external casings 31 and 32 in superimposed relation and carry the inner casing 35 in spaced concentric relation inside of the casing 32 to provide an annular discharge passageway 38 between the casings 32 and 35.

The top of the casing 32 has a dome 39 converging to an upstanding cylindrical neck 40 having an external flange 41 on which is mounted the flange 42 of a discharge pipe 26. The passageway 38 discharges through the neck 40 into the outlet pipe 26 and the flanges 41 and 42 are coupled together in sealed relation.

The top of the casing 35 has a wall 43 spanning the space under the neck 40 in spaced relation so as not to impede flow from the annular passage 38 and a conduit tube 44 is secured in this wall at the periphery thereof and extends through a neck 45 on the periphery of the dome 39. A seal ring 46 and collar 47 prevent leakage between the neck 45 and conduit 44. The conduit tube 44, as illustrated in FIGURE 3, extends into a coupling box 45 for a wiring conduit 46. An electric motor M is mounted in the casing 35 and includes a stationary field 48 surrounding a rotating armature 49 on a central vertical shaft 50. The field 48 can be carried in the casing 35 on ribs 51 secured to the side wall of the casing and electric wires 52 connected to the field winding extend through the conduit 44 in sealed relation thereto as by potting material 52a. The field winding is held axially in the casing 35 by shoulders such as 53 at the tops of the ribs 51 and by a locking ring 54 secured to the bottoms of the ribs 51.

The top wall 43 of the casing 35 carries a depending tube 55 reinforced by surrounding ribs 56 and radially supporting a ball bearing unit 57. The top of the shaft 50 is mounted in the inner race of the bearing unit 57 with a shoulder of the shaft bottoming this inner race ring and a washer bolted over the top of the shaft extending therefrom over the inner race. Tube 55 has a small vent hole located at the top wall for gas or air release.

The pump casing 31 has a downwardly sloping bottom 58 converging to a cylindrical neck 59 which flares out at its bottom end to provide a radial flange 60. Circumferentially spaced vertical ribs 61 radiate from the neck 59 and extend between the bottom 58 and flange 60. An inlet bell plate 62 is supported by the flange 60 and radiates therefrom in a downward sloping direction. Four circumferentially spaced legs 63 depend from the flange 60 inside of the plate 62 and serve to space the periphery of the plate and the inlet mouth of the pump casing just above the floor F of the tank or ship's hold in which the unit 16 may be mounted. Brackets B also mounted on the floor F extend vertically upward therefrom alongside of the unit 16 and have top flanges underlying the flange 33 of the casing 31. Suitable bolts can be provided to secure the brackets B to the flange 33. In this manner the unit 16 is vertically mounted on the bottom of the tank or hull with its inlet very closely spaced above this bottom. The plate 62 affords very good stripping action for insuring complete scavenging of the tank.

The flange 60 of the pump casing coacts with the stripper plate 62 to provide a bell mouth entry or inlet to the neck 59. This neck preferably has a cylindrical bottom end 59a and a conical or tapered portion 59b converging from the cylindrical bottom 59a to a counterbore 64 in the domed bottom 58 of the pump casing 31.

An open top cup-shaped inner pump casing 65 is seated in the casing 31 and has a radial array of circumferentially spaced arcuately curved diffuser vanes 66 around the cylindrical periphery thereof snugly seated in the cylindrical side wall of the outer casing 31. These curved vanes extend in a generally vertical direction from the bottom 67 of the casing 65 to the top of the casing. The open top of the casing 65 is counterbored to receive a depending pilot 68 of the top inner casing 35 and an O-ring seal 69 is seated around this pilot 68 inside of the open top of the counterbore to sealingly connect the two inner casings 35 and 65.

The flange 36 of the top inner casing 35 receives bolts 70 therethrough which are threaded into boss portions on the upper ends of the vanes 66. These bolts 70 serve to tightly draw the two casings 35 and 65 in sealed-together relation.

Figure 4:
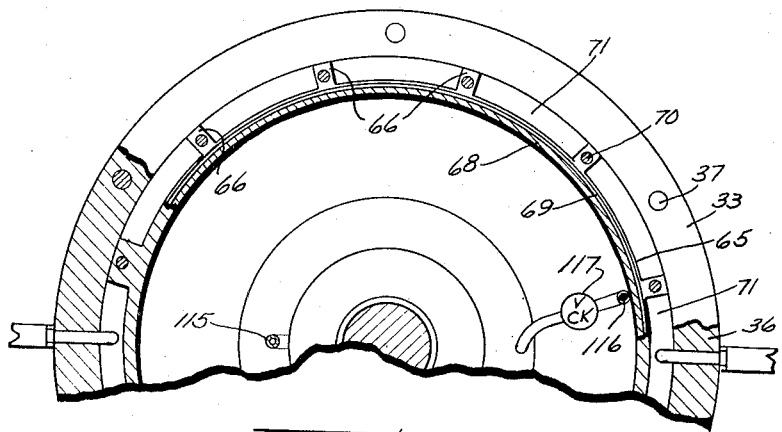
FIGURE 4 is a fragmentary transverse cross sectional view taken generally along the line IV—IV of FIGURE 2 to show the diffusion vanes and outlet for the pumped liquids.
Figure 5:
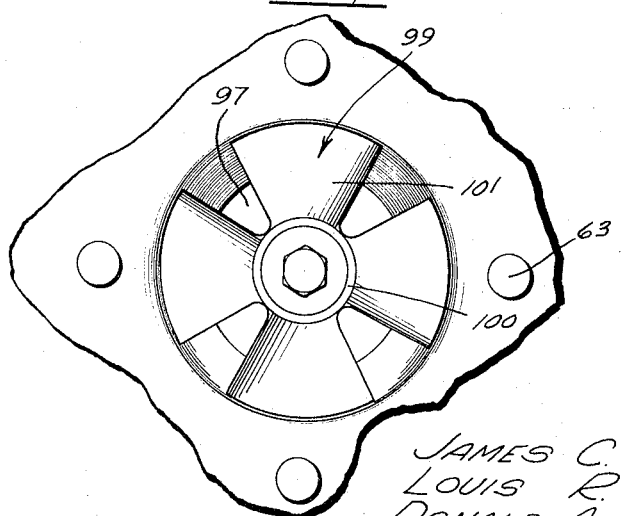
FIGURE 5 is a fragmentary bottom plan view of the inlet end of the pump of this invention showing the inducer blades.

As shown in FIGURE 4, the casing flange 36 has ports 71 therethrough between the vanes 66 so that liquid will flow freely from the passages between the vanes to the annular passage 38 between the top casings 32 and 35.

The bottom 67 of the inner pump casing 65 has an upstanding central post 73 integral therewith and providing an open bottom central recess 74, a radial flange 75 at the inboard end of the recess 74, a chamber 76 above the flange, a second radial flange 77 at the inboard end of the chamber 76, a radial annular chamber 78 above the flange 77 with passages 78a opening into the inner pump casing 65, and a neck 79 above the passage 78. The neck 79 supports a ball bearing assembly 80 which opposes the ball bearing asembly 57 and coacts therewith to rotatably support the shaft 50. The inner race ring of the ball bearing assembly 80 is bottomed on a shoulder 50a of the shaft 50 and held thereagainst by a locking nut 81 threaded on the shaft to thereby align the shaft axially.

A first face type rotary shaft seal 82 is provided at the portion of the pump shaft 50 adjacent the flange 77 while a second similar seal 83 is provided on a lower portion of the shaft and having the fixed part thereof carried by a plate 84 which is carried by the flange 75 and which forms a bottom for the chamber 76.

A double shrouded centrifugal pump impeller 85 is mounted on the pump shaft 50 below the seal 83 and includes a central hub 86 on the shaft, a top shroud flange 87 radiating from this hub 86, an upstanding cylindrical flange 88 on the shroud 87 intermediate the ends thereof, a plurality of circumferentially spaced impeller vanes 89 depending from the shroud 87 and a bottom shroud 90 around the bottom ends of the vanes 89. The shroud 90 had a depending cylindrical collar 91 extending into an impeller wear ring assembly 92 in close running fit to the casing wear ring assembly 94 fitted into the counterbore 64 of the casing neck 59.

The centrifugal vanes 89 extend from the inboard end of the collar 91 between the shrouds 87 and 90 to the peripheries of the shrouds. The shroud 87 rides closely in a recess 93 in the bottom wall 67 of the pump casing 65 while the bottom shroud 90 closely overlies the bottom 58 of the outer pump casing 31.

A casing wear ring assembly 94 is secured in a counterbore 95 in the bottom of the post 73 and receives the flange 88 on the shroud 87 of the impeller. The space 74 thus provided around the impeller hub 86 between the closure plate 92 and the shroud 87 is vented through ports such as 96 in the shroud 87 to the inlet eye of the pump. Thus the bottommost seal assembly 83 has its outboard end vented to pump inlet pressures. The wear ring assemblies 92 and 94 with the cooperating collars 91 and 88 of the shrouds 90 and 87 are effective to close off any passageways between the shrouds and the pump casings from the interior of the impeller.

A spacer 98 surrounds the bottom end of the shaft 50 under the impeller hub 86 and an axial flow inducing impeller 99 has a central hub 100 mounted on this shaft under the spacer 98 together with radial axial flow inducing vanes 101 radiating from the hub 100 and terminating in closely spaced relation to the cylindrical portion 59a of the neck 59. The inducer impeller 99 thus spans the inlet eye of the pump and coacts with the stripper plate 62 surrounding the inlet for completely scavenging the tanks in which the pumps of this invention may be mounted. The liquid being pumped is centrifugally discharged from the pump eye 97 by the main pump impeller 85 into an annular space 102 between the pump casings 31 and 65. The radial vanes 66 in this space balance radial loads on the assembly and converts the velocity into pressure as the liquid flows between the vanes, thence through the annular chamber 38 and on through the neck 40 into the discharge conduit 26 en route to the header pipe 25.

The support system 17 of circulating oil for protecting the pump 16 against hostile environments in which it may be submerged is illustrated in FIGURE 3 wherein the lubricant oil tank 18 is shown as having a pair of side-by-side chambers 103 and 104 divided by a vertical baffle 105 having a vertical screen 106 thereabove through which oil must flow from the chamber 103 into the chamber 104. The chamber 103 has a sediment sludge trap 107 in the bottom thereof under a grid 108 and sludge or water can be drained through a drain outlet 109 in the bottom of the tank. Oil is introduced into the top of the chamber 103 through a filler opening 110 and oil level can be read by a dip stick 111 on the closure cap for the opening 110.

Oil from the chamber 103 flows over the baffle 105 through the screen 106 into the chamber 104 from which it is pumped by the pump 19 through the oil filter 20 into the header pipe 21 feeding the branch pipes such as 22 to the pump 16. The pump 19 is preferably protected by an inlet screen 112 in the bottom of the chamber 104. The flange 36 of the top inner pump casing 35 has a pipe fitting 113 thereon receiving the inlet pipe 22 and a tube 114 is extended through a bore in this flange or is connected to a bored out passageway of the flange for conveying oil to the chamber 120 under the bearing 80 and above the seal 82. From this chamber 120 oil will flood the bearing 80 and will also serve to lubricate and flush wear products from the seal 82 through chamber 78 out into the motor housing formed by inner pump casing 65.

A tube 115 connects the chamber 120 with the interior of the tube 55 that supports the top bearing 57 and oil flows through this top bearing to lubricate the same. Outlet vents such as 121 are provided through the top of the tube 55 to join the interior of the tube with the top of the motor casing. Oil supplied to the lower chamber 120 from the tube 114 flows both upwardly and downwardly from the chamber along the shaft. The motor compartment is filled with oil by the discharge or outflow from both bearings 57 and 80 and an overflow tube 116 receives oil at a level near the top of the motor and above the vent hole 121. The overflow tube 116 discharges into the chamber 76 between the seals 82 and 83 and a check valve 117 is provided in the tube to prevent reverse flow in the event pressure in the chamber 76 should ever exceed pressure existing in the motor casing.

Oil from the chamber 76 is discharged through a tube 118 extended through the flange 36 or connected to a passageway through this flange to discharge through a nipple 119 into the return pipe 24 which is connected to the header 23 back to the chamber 103 of the supply tank 18. The header 23 discharges into the bottom of the chamber 103 above the sludge trap level.

The support system of circulating oil thus supplies clean filtered liquid to the bearings and seals of the pump 16, floods the motor chamber with this oil and washes away particles of wear. The tubing arrangement inside the motor assures venting of all air or gas and complete filling of liquid at all times. The continually circulating lubricating oil also serves to control the operating temperature of the pump unit 16 since the oil could be heated to warm up a very cold pump unit or could be cooled to dissipate heat from the operating unit. The oil pump 19 is of sufficient capacity to coact with the check valves 117 in each pump 16 for insuring a pressure buildup in each motor compartment which will be greater than any inlet pressure to which the pump will be subjected even under the highest head of operation. This insures against leakage of any hostile environment surrounding the pump into any part of the pump which will be subject to corrosion or harmful wear by this environment. The portions of each pump 16 which contact the liquid being pumped are composed of corrosion resisting metals designed for best resisting the media being pumped. As shown in FIGURES 2 and 3 the pump unit 16 may have lifting lugs L provided around the top thereof to facilitate servicing of the pump. The supporting bracket for the pump can be merely resting on the tank floor or some easily accessible quick disconnect coupling mechanism can be provided between these brackets and the pump casing thereby accommodating removal of the pumps from the tops of the tanks.

If desired, circulation of oil through the lubricant support system of this invention can be effected in part or entirely by an internal auxiliary pump impeller on the main pump shaft 50 in addition to or in place of the external pump 19. For example, the pump impeller could be mounted on the shaft and operate in the chamber 120, receiving the oil from the tube 114 and discharging the oil through the tube 115. The internal pump would be practical on small or single pump installations where space does not permit the external pump 19. It will therefore be understood that the invention includes both external pumps and internal pumps for the lubrication support system.

From the above description it will therefore be understood that the pump and motor units of this invention are adapted to be completely submerged in hostile liquids, subjected to great head pressures in the bottoms of ships holds and are capable of completely scavenging liquids from the hulls without ever exposing the motor unit, the bearings or the inner seal to the hostile liquid environment. The pumps of this invention are protected by a support system of circulating oil serviced from an easily accessible station.

Although various minor modifications might be suggested by those versed in the art, it should be understood that we wish to embody within the scope of the patent granted hereon all such embodiments as reasonably and properly come within the scope of our contribution to the art.

We claim as our invention:

1. A submerged motor driven cargo pumping system adapted for scavenging tanker ships and the like which comprises a plurality of centrifugal pump and motor units having means for mounting the same in the bottoms of the tanks of a tanker ship in completely submerged relation with the medium to be pumped from the ship, said pump and motor units each having a sealed casing with a pump compartment and a motor compartment, said motor compartment being sealed from said pump compartment, said pump compartment having an inlet communicating freely with the medium to be pumped, and a support system for mounting above the tanks of the tanker ships for circulating oil through all of said pump and motor units, said system including a source of lubricating oil, a filter for cleaning the lubricating oil, a pump for circulating the lubricating oil and piping conveying filtered oil to each pump and motor unit and for returning the oil from each pump and motor unit back to the source, and each pump and motor unit having internal tubing distributing oil to the wearable parts of the unit while flooding the motor compartment with oil, and purging air or gas from the motor compartment.

2. A submerged motor driven pumping system which comprises a plurality of electric motor driven centrifugal pump units adapted to be mounted upright in completely submerged relation to the medium to be pumped, each of said units having a motor compartment sealed from the medium being pumped, and a support system remote from the pumps for circulating oil through all of said pumps including a lubricating oil source, a single pump for circulating oil from said source through the motor compartment of each of said pump and motor units and a filter for cleaning the lubricating oil.

3. A pumping system for oil tankers and the like cargo ships which comprises a plurality of electric motor driven centrifugal pump units adapted for mounting in the bottom of the ship's hull to scavenge oil from the tanks of the ship, each of said units having an electric motor compartment sealed from the medium to be pumped, and a single oil support system for all of said pumps including a lubricating oil source, a lubricating oil pump, a filter, and piping for circulating filtered oil from said source through each of the motor compartments of the units and back to the oil source.

4. A submerged pump unit which comprises a casing having a bottom pump compartment and a top electric motor compartment, bearings in said top compartment, a motor shaft supported by said bearings and extending into the pump compartment, a pump impeller in the pump compartment mounted on said motor shaft, a shaft seal sealingly separating said motor and pump compartment, means for circulating lubricating oil through said motor compartment and a check valve in said motor compartment for maintaining oil pressure therein greater than inlet pressure of the pump compartment.

5. A submerged electric motor driven pump unit which comprises a casing having a motor compartment in one end thereof and a pump compartment in the other end thereof, said pump compartment having an axial inlet and a radial outlet surrounding the motor compartment, said motor compartment having aligned bearings in the opposite ends thereof, a motor shaft rotatably supported by said aligned bearings and extending from the motor compartment into the pump compartment, a first shaft seal facing the motor compartment, a second shaft seal facing the pump compartment, casing structure defining a chamber between the first and second shaft seals, means circulating oil from an outside source to both axially aligned bearings, an overflow tube in the motor compartment joining the top of the compartment with the chamber between the seals, a check valve in said tube preventing backflow through the tube, and an outlet tube connecting said chamber between the seals with the exterior of the casing whereby oil will flood the bearings, submerge the motor, lubricate the seals, and wash away particles of wear.

6. A submerged electric motor driven pump unit which comprises a pump casing having an open top cup-shaped upper portion with a depending neck terminating in an outturned flange providing an inlet eye for the pump, an inner cup-shaped pump casing inside of said first mentioned casing having ribs radiating therefrom engaging the outer casing and providing axial flow passages between the casings, said second casing having an upstanding central post portion with an axial bore therethrough, a pair of nested space concentric casing bells overlying the pump casing and secured thereto to provide therebetween an annular passage receiving fluid flow from the ribs, the outer bell having an axially extended discharge neck at the axial end thereof, the inner bell having an end wall spanning said neck, a depending bearing support on said end wall aligned with said post, bearings mounted at the inboard ends of said post and bearing support, a motor shaft carried by said bearings and extending through the bore of the post, a pump impeller mounted on said shaft and extending between the pump casings to discharge liquid to the ribs, an inducer impeller on the pump shaft in the inlet of the first mentioned pump casing for inducing axial flow of liquid to the centrifugal impeller, seals between the post and pump shaft for separating the motor and pump compartments, means for introducing lubricating oil into the motor compartment, tubes in the motor compartment conveying the lubricating oil to the bearings, an overflow tube communicating with the top of the motor compartment for maintaining an oil level in the compartment and venting any entrained gases therefrom, a check valve in the overflow tube preventing backflow of oil, and an outlet tube communicating with the bottom portion of the motor compartment for discharging oil therefrom.

7. A submerged electric motor driven centrifugal pump unit which comprises opposed casing halves, each casing half having an interior and an exterior cup-shaped casing in nested spaced concentric relation providing therebetween a discharge passageway for fluid being pumped, one of said exterior casings having a depending portion providing an inlet eye for the centrifugal pump, the other of said exterior casings having an outlet neck providing a discharge passageway for the space between the casings, flange means on one of the interior casings extended between the exterior casings and secured thereto, the other of said interior casings being sealingly connected to the flanged interior casing, diffusion ribs between one pair of interior and exterior casings for diffusing flow from the pump in an axial direction to flow between the casings, seal means separating a motor compartment and a pump compartment in said casings, and means for circulating external oil through the motor compartment.

8. An electric motor driven pump unit adapted to be submerged in a hostile liquid without being damaged by the liquid which comprises a generally tubular elongated casing having sealingly separated pump and motor compartments in opposite ends thereof, an electric motor in said motor compartment having an axial shaft extending from the motor into the pump compartment, an axial flow inducer impeller on said shaft adjacent the inlet to the pump compartment, a centrifugal pump impeller on said shaft in said motor compartment downstream from the axial flow impeller, said casing having an annular passage receiving the discharge from said centrifugal pump impeller, diffuser vanes in said passage effective to balance the radial load of the pump and convert velocity into pressure, said casing having an axial outlet for said passage, tubes in said motor compartment for distributing oil therein, external means communicating with one of said tubes for introducing oil into the motor compartment, a second external means communicating with another of said tubes for removing oil from said motor compartment, and check valve means in one of said tubes for maintaining a desired lubricant pressure in said motor compartment.

9. An electric motor driven pump unit and lubricating system, said unit adapted to be submerged in liquid to be pumped and comprising a generally tubular casing having an inlet in one end and an outlet in the other end together with an annular passage therethrough joining the inlet and outlet, said outlet end of the casing having a motor compartment therein, said inlet end of the casing having a pump compartment therein, seals separating said compartments, an electric motor in said motor compartment, a bearing supported shaft in said motor compartment driven by said motor and extending from the motor compartment into the pump compartment, pumping means on said shaft in said pump compartment effective to pump liquids from the inlet of the pump compartment to the annular passageway for flow therethrough to the outlet, oil distribution tubes in said motor compartment with outlets effective to flood the bearings for the shaft with oil, one of said tubes having a high-level inlet to maintain a desired oil level in the motor compartment, one of said tubes having an inlet passage communicating with the exterior of the casing, another of said tubes having an outlet passage communicating with the exterior of the casing, and external means including a source of lubricant and a pump connected to the inlet passage of said one of the tubes and to the outlet passage of said another of the tubes, whereby oil can be flowed through the tubes to flood the bearings, wash-out particles of wear, maintain a desired dielectric in the motor compartment, and control the temperature of the motor compartment.

References Cited by the Examiner

UNITED STATES PATENTS

| | | | |
|---|---|---|---|
| 1,263,679 | 4/1918 | Kilbele | 114—74 |
| 1,425,308 | 8/1922 | Woock et al. | 103—87 |
| 1,968,566 | 7/1934 | Moran et al. | 103—87 |
| 2,857,181 | 10/1958 | Myers. | |
| 3,075,104 | 1/1963 | Willyoung et al. | 310—54 |

ROBERT M. WALKER, *Primary Examiner.*